(12) United States Patent
Fetahovic

(10) Patent No.: US 12,227,850 B2
(45) Date of Patent: Feb. 18, 2025

(54) PICKLE FOR POLYAMIDE

(71) Applicant: HSO HERBERT SCHMIDT GmbH & Co. KG, Solingen (DE)

(72) Inventor: Almedina Fetahovic, Solingen (DE)

(73) Assignee: HSO Herbert Schmidt GmbH & Co. KG, Solingen (DE)

( * ) Notice: Subject to any disclaimer, the term of this patent is extended or adjusted under 35 U.S.C. 154(b) by 0 days.

(21) Appl. No.: 18/281,990

(22) PCT Filed: Mar. 28, 2022

(86) PCT No.: PCT/EP2022/058134
§ 371 (c)(1),
(2) Date: Sep. 14, 2023

(87) PCT Pub. No.: WO2022/207559
PCT Pub. Date: Oct. 6, 2022

(65) Prior Publication Data
US 2024/0301557 A1    Sep. 12, 2024

(30) Foreign Application Priority Data
Mar. 29, 2021   (EP) .................................... 21165510

(51) Int. Cl.
C23C 18/24    (2006.01)
C09K 13/08    (2006.01)
C23C 18/20    (2006.01)
C23C 18/32    (2006.01)

(52) U.S. Cl.
CPC .......... *C23C 18/2073* (2013.01); *C09K 13/08* (2013.01); *C23C 18/24* (2013.01); *C23C 18/32* (2013.01)

(58) Field of Classification Search
CPC ..... C23C 18/2073; C23C 18/24; C23C 18/32; C09K 13/08
See application file for complete search history.

(56) References Cited

U.S. PATENT DOCUMENTS

| | | | |
|---|---|---|---|
| 3,230,172 A * | 1/1966 | Gasperini | C23G 1/086 252/79.3 |
| 4,335,164 A | 6/1982 | Dillard et al. | |
| 4,495,253 A | 1/1985 | Abel | |
| 5,512,129 A * | 4/1996 | Brodalla | C23G 1/36 134/2 |
| 8,192,556 B2 * | 6/2012 | Giordani | C23F 3/06 134/41 |
| 2004/0132300 A1 * | 7/2004 | Konigshofen | C23C 18/1653 438/689 |
| 2009/0159096 A1 * | 6/2009 | Hsu | C23C 22/18 510/254 |
| 2011/0135949 A1 | 6/2011 | Elia | |
| 2012/0234682 A1 | 9/2012 | Dubois et al. | |
| 2012/0252148 A1 | 10/2012 | Park et al. | |

FOREIGN PATENT DOCUMENTS

| | | | | |
|---|---|---|---|---|
| CN | 106435612 A | * | 2/2017 | ............... C23G 1/12 |
| EP | 1942207 A1 | | 7/2008 | |
| JP | 4596909 B2 | * | 10/2010 | ............... C23G 1/08 |
| KR | 10-1361839 B1 | | 2/2014 | |
| KR | 10-1394469 B1 | | 5/2014 | |
| KR | 2016-0099525 A | | 8/2016 | |

OTHER PUBLICATIONS

Konishi, Yasuhiro, et al., "A new synthesis route from spent sulfuric acid pickling solution to ferrite nanoparticles". Hydrometallurgy, 74 (2004) 57-65.*
Zhao, Yan, et al., "A new synthesis route from spent sulfuric acid pickling solution to ferrite nanoparticles". Poultry Science, vol. 94, Issue 9, Sep. 1, 2015, pp. 2272-2279.*
Wang, Yongmi, et al., "Research on extraction of zinc from spent pickling solution using Aliquat". Hydrometallurgy, 193, (2020) 105322, pp. 1-7.*
International Search Report for corresponding Patent Application No. PCT/EP2022/058134 dated Jul. 11, 2022.

* cited by examiner

*Primary Examiner* — Bret P Chen
(74) *Attorney, Agent, or Firm* — Carmody Torrance Sandak & Hennessey LLP

(57) ABSTRACT

Process for pickling polyamide,
  comprising the steps
  a) contacting the polyamide with a pickling solution comprising
    a mixture of at least two inorganic acids
    $MHF_2$, where M is an alkali ion or an ammonium ion
    a monocarboxylic acid with 1 to 5 carbon atoms
  b) contacting with an organic solvent having 1 to 10 carbon atoms, wherein
  steps a) and b) take place consecutively or simultaneously.

20 Claims, 2 Drawing Sheets

PICKLE FOR POLYAMIDE

CROSS REFERENCE TO RELATED APPLICATIONS

This application is a National Stage filing of PCT Application No. PCT/EP2022/058134 filed Mar. 28, 2022, entitled "Pickle for Polyamide", which claims priority to European Patent Application No. 21165510.5, filed Mar. 29, 2021.

FIELD OF THE INVENTION

The present invention relates to a process for pickling polyamide prior to subsequent metallization and to the pickling solution used for this purpose.

BACKGROUND OF THE INVENTION

Before metallizing polyamide surfaces, they must be pickled to allow metal layers to adhere.

Typical plastics that are metal-coated (electroplated) are acrylonitrile-butadiene-styrene copolymers (ABS) and ABS polycarbonates (ABS-PC). These are used for decorative elements, switches, display elements, etc., for example in automobiles.

Polyamide (PA) plastic surfaces are often coated with suitable metal layers for decorative and technical reasons. Polyamide (PA) is used in automotive engineering, for example, due to its special properties, to give door handles and other safety-relevant components sufficient strength. The decorative, valuable character required at this point is underlined by an adhesive metallic coating.

For the durability of the metal layers deposited on the polyamide surfaces, it is of decisive importance that they have sufficient adhesive strength on the polyamide surfaces. For the formation of a corresponding adhesive strength, it is therefore common in the prior art to roughen/swell the polyamide surfaces prior to a corresponding metal deposition in order to be able to ensure a sufficient adhesive strength of the deposited metal layers. Various processes are known in the prior art for this purpose. Typically, polyamide surfaces are treated with a combination of chromium(VI)- and fluoride-containing pickling solutions and then metallized. Such chromosulfuric acid-based pickling solutions can, for example, contain chromium(VI) oxide and sulfuric acid in a weight ratio of 1:1.

A typical pickling solution for polyamides includes chromium(VI)-based compounds containing chromium. However, chromium(VI)-containing compounds are suspected of being carcinogenic, so the handling of these compounds is subject to strict environmental protection and occupational safety regulations. A ban on the commercial use of chromium(VI) within the European Union is expected under REACH.

SUMMARY OF THE INVENTION

The task of the present invention was therefore to provide a process for pickling a component made of polyamide which overcomes at least some of the disadvantages mentioned, in particular does not contain a chromium compound.

DETAILED DESCRIPTION OF THE PREFERRED EMBODIMENTS

Figure 1:
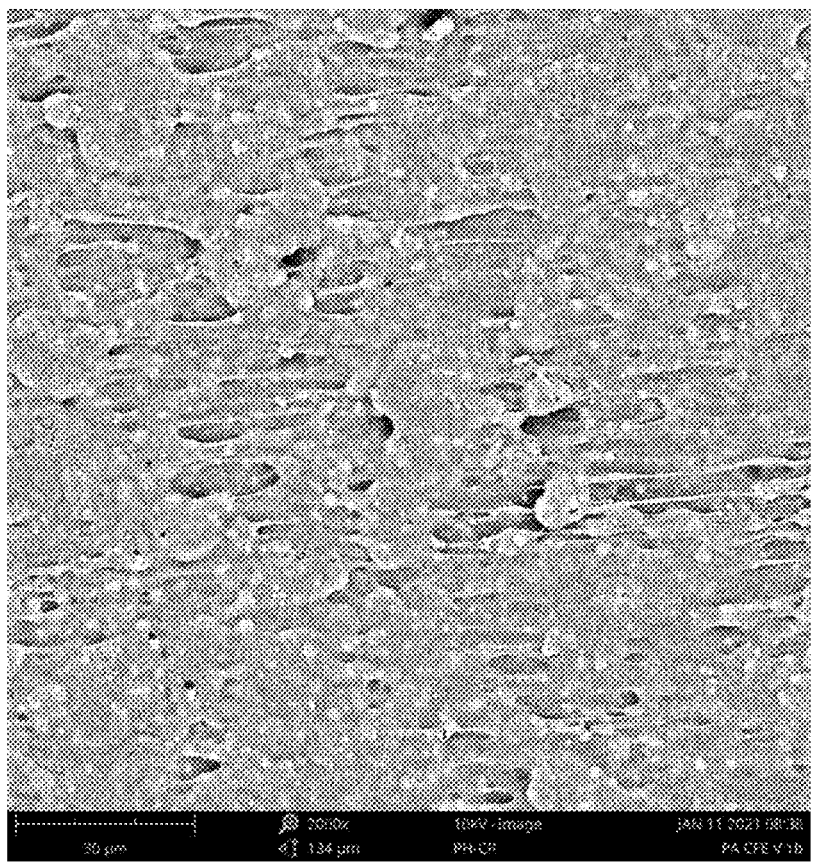
FIG. 1 is an SEM image of Example 1 according to the invention.

The task is solved by a process for pickling polyamide, comprising the steps of
   a) contacting the polyamide with a pickling solution containing
      a mixture of at least two inorganic acids
      $MHF_2$, where M is an alkali ion or an ammonium ion.
      a monocarboxylic acid with 1 to 5 carbon atoms
   b) contacting with an organic solvent having 1 to 10 carbon atoms, wherein
steps a) and b) take place consecutively or simultaneously.

The composition according to the invention allows the pickling of a polyamide for subsequent metallization without resorting to chromium and in particular chromium(VI).

Preferred is a pickling solution, wherein the pickling solution is substantially free of chromium, in particular with a chromium content <1 mg/l.

In this process, the surface of the polyamide, e.g. a polyamide component, is roughened; tiny cavities are created. Strong mineral acids are also capable of breaking amide bonds.

In one embodiment of the invention, the pickling solution contains two inorganic acids, a fluoride source and a monocarboxylic acid. After pickling therewith, the pickled product is contacted with an organic solvent.

In another embodiment, contact with the acidic pickling solution and the organic solvent occurs simultaneously.

Suitable inorganic acids are in particular the typical mineral acids hydrochloric acid, phosphoric acid, sulfuric acid, nitric acid, with hydrochloric acid and phosphoric acid being preferred.

Sodium hydrogen fluoride, potassium hydrogen fluoride and ammonium hydrogen fluoride are particularly suitable fluoride sources.

Suitable monocarboxylic acids include methanoic acid, ethanoic acid, propanoic acid or mixtures thereof.

Suitable organic solvents with 1 to 10 C atoms include, for example, n-butanol, isobutanol, t-butanol, isopropanol, n-propanol, and glycol ethers such as 1-methoxy-2-propanol, 2-butoxyethan-1-ol, 2-(2-butoxyethoxy)ethanol, 2-(2-methoxyethoxy)ethanol, dipropylene glycol methyl ether and mixtures thereof. Compounds having 3 to 8 carbon atoms are preferred. Preferably, the organic solvent is selected from alcohols and ethers.

Suitable concentrations are for example

Mixtures of inorganic acids in a concentration of 1 to 5 mol/l in the pickle.

$MHF_2$ 5 to 50 g/l

Monocarboxylic acid 50 to 300 g/l optionally organic solvents 30 to 100 g/l.

Volume is measured at 23° C.

The mixture of two inorganic acids may contain the two acids each independently in the range of 0.5 to 3 mol/l, preferably the total concentration is 1 to 4 or 2 to 4 mol/l.

Contact with the polyamide takes place in a suitable manner at temperatures typically between 20 and 50° C. Suitable contact times are about 3 to 15 minutes.

When carrying out the process according to the invention, it is not absolutely necessary to move the pickling solution or the product in the pickling solution. In some embodiments, the pickling solution or product is agitated in the pickling solution.

It is recommended that at least one rinse step be performed after pickling before proceeding.

In many cases, it makes sense to carry out the rinsing steps twice. A particularly suitable process is one in which a first hot rinsing step is carried out at a temperature above 25° C., followed by a cold rinsing step at room temperature. A suitable temperature range for the hot rinsing step is between 30 and 40° C.

For both the hot rinse and cold rinse steps, surfactants may be included in the rinse solution to improve surface wetting. Surfactants may also be included in the hot rinse step and no surfactants may be included in the cold rinse step. Typical exposure times in the rinsing steps are between 3 and 10 minutes.

One or more rinsing steps can also be performed as alkaline rinsing steps to neutralize the surfaces. During the hot rinse step, agitation of the wash solution can occur by air injection. Cold rinse steps typically occur without bath agitation.

The typical further steps are contacting with a catalyst to deposit metal nuclei on the pickled surface. Such processes are known to those skilled in the art and can also be used for surfaces pickled according to the invention. Common metals for this purpose are, for example, palladium, platinum, silver or ruthenium. These are typically brought into contact with the pickled surface as a colloid. Processes are known in which the deposition of the metal nuclei is effected by acids as well as by alkalis.

This is usually followed by electroless metallization with layers of copper or nickel by reduction from their metal salts. In principle, other electroless deposition processes are also known, for example for the deposition of cobalt, copper/nickel, nickel/cobalt or gold layers. In some embodiments, an ammonium-free electroless nickel process is used.

The metallization without external current can then be followed by the coating with further layers, as is also known to the skilled person for other plastics.

Preferably, therefore, the process according to the invention comprises the steps:
  Pickling with the pickle according to the invention
  Separation of metal nuclei with a catalyst
  Electroless deposition of a first metal layer, as well as deposition of further metal layers, if necessary.

It is also an object of the invention to provide a pickling solution containing
  a mixture of at least two inorganic acids
  $MHF_2$, where M is an alkali ion or an ammonium ion.
  a monocarboxylic acid with 1 to 5 C atoms.

It is also an object of the present invention to use the pickling solution for pickling polyamides, in particular PA6.

The invention is explained in more detail by the present examples:

EXAMPLE 1: PICKLING

A component was treated with a pickling solution with the following composition
  HCl 37%-ig: 150 ml/L
  $H_3PO_4$ 85%-ig: 100 ml/L
  2-(2-butoxyethoxy)ethanol: 50 ml/L
  Ammonium bifluoride: 35 g/L
  Formic acid: 100 ml/L
  Rest: water
  pickled for 5 minutes at 40° C.
The pickled polyamide was a PA6M40 specimen of size 3 $dm^2$.

As a comparison, the identical polyamide was pickled with a commercial chromium(VI) pickle ($CrO_3$ 380 g/l, $H_2SO_4$ 380 g/l).

Figure 2:
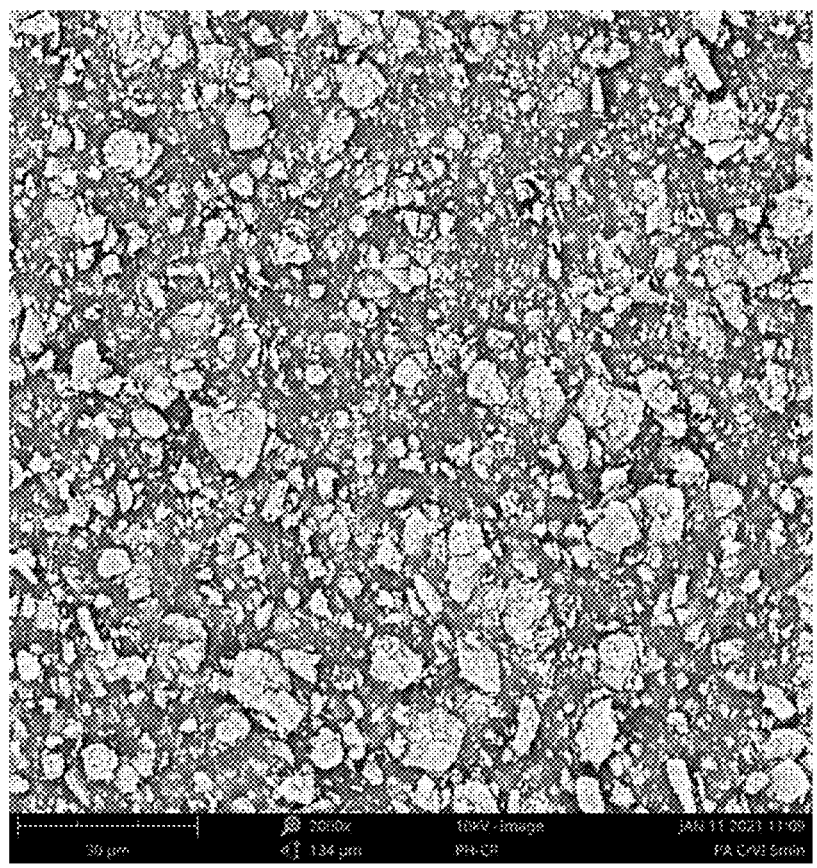
FIG. 2 is an SEM image of the comparative example.

Two SEM images of the example according to the invention and the comparative example are shown in FIG. 1 and FIG. 2.

It can be seen that the surface structure is attacked differently. A qualitative difference is practically not assessable at this level.

EXAMPLE 2: FLUSHING AND ACTIVATION

The surfaces were first rinsed at 35° C. for 5 minutes with air agitation and then cold at room temperature for 2 minutes with no agitation and no wetting agent added, and activated with a catalyst containing palladium at a concentration of 40 mg/L palladium at 40° C. for 4 minutes. The amount of deposited palladium was then measured at the surface. It was >0.3 mg/$dm^2$ for the polyamide etched according to the invention and 0.3 mg/$dm^2$ for the comparative product. A higher loading of palladium facilitates the electroless deposition of further layers.

EXAMPLE 3: ELECTROLESS DEPOSITION

In the next step, the products thus obtained were coated using a nickel solution depositing without external current.

EXAMPLE 4: ANALYSES

In a pull-off test according to DIN 53494, a pull-off strength of >15 N/cm could be achieved with the product according to the invention, and 8 N/cm with the comparative product. Determining the pull-off force of the metal layer of a galvanized plastic part according to this standard enables a comparative assessment of processes and investigations into the influence of process parameters on test specimens with smooth, flat surfaces. The peel force within the meaning of the standard is the force in N required to peel off a 25 mm wide strip of a 40 μm thick copper layer perpendicular to the specimen surface.

A product obtained from the ATO company was used as another comparative product.

Processing with
  400 ml/l PA Sweller Concentrate and 130 ml/l PA Conditioner at 40° C.—5 min.
  Rinse at 40° C.—8 minutes
  then cold rinsed for 2×4 minutes The remaining steps were identical. Here, only a nickel layer with a peel strength of 6.9 N/cm could be achieved.

The present results show that, despite the use of environmentally friendly, chromium-free stains, adhesion levels superior to the state of the art are achieved.

EXAMPLE 5: VARIATION OF THE SOLVENT

The type of solvent was varied as indicated below.

The surface energy was measured in accordance with the determination of the free surface energy of solid surfaces by measuring the contact angle according to DIN 55660-2. Krüss Advance software was used.

| Solvent | Free Surface energy in mN/m | Dispersive mN/m | polar mN/m |
|---|---|---|---|
| Isopropanol | 75.71 | 46.07 | 29.64 |
| 1-Methoxy-2-propanol | 63.62 | 42.7 | 20.92 |
| 2-Butoxyethan-1-ol | 72.89 | 45.95 | 26.93 |
| 2-(2-Butoxyethoxy)ethanol | 70.8 | 44.81 | 25.98 |
| 2-(2-methoxyethoxy)ethanol | 59.58 | 42.25 | 17.32 |
| Dipropylene glycol methyl ether | 64.77 | 47.78 | 16.98 |

Subsequently, rinsing, activation and subsequent deposition were carried out as above. After activation, palladium incorporation was measured, and after deposition, adhesion was monitored over a period of time. Finally, a shock test (100° C. for 1 h, followed by quenching) was performed with up to three repetitions with a visual assessment.

| Solvent | Adhesion measurement 1 [N/cm] | Adhesion measurement 2 [N/cm] | Adhesion Measurement 3 [N/cm] | Shock test | Pd incorporation in mg/dm$^2$ |
|---|---|---|---|---|---|
| Isopropanol | 24.24 (3 d) | 19.97 (8 d) | 26.48 (13 d) | After 3rd round i.o. | 0.383 |
| 1-Methoxy-2-propanol | 16.46 (2 d) | 14.2 (7 d) | 18.8 (12 d) | Failure after the 2nd round (bubbles back) | 0.405 |
| 2-Butoxyethan-1-ol | 22.26 (2 d) | 21.18 (7 d) | 24.37 (12 d) | After 3rd round i.o. | 0.388 |
| 2-(2-Butoxy-ethoxy)-ethanol | 23.73 (1 d) | 20.19 (6 d) | 20.81 (11 d) | After 3rd round i.o. | 0.39 |
| 2-(2-Methoxyethoxy)-ethanol | 27.07 (1 d) | 19.91 (6 d) | 21.49 (11 d) | After 3rd round i.o. | 0.408 |
| Dipropylene glycol-methyl ether | 13.7 (1 d) | 11.44 (4 d) | 13.01 (7 d) | Failure after the 2. Round, blister at the Contact point | 0.47 |

The shock test shows differences in the stability of the coating; depending on the application it is not necessary to pass repetitions to be suitable for the application.

EXAMPLE 6: RELEVANCE OF THE COMPONENTS

These experiments were performed using 2-(2-butoxy-ethoxy)ethanol as solvent.

| Designation | Surface free energy in mN/m | dispersive mN/m | polar mN/m |
|---|---|---|---|
| without HCl | 47.42 | 40.09 | 7.33 |
| without $H_3PO_4$ | 59.76 | 44.55 | 15.22 |
| without $CH O_{22}$ | 55.32 | 40.09 | 15.24 |
| Without LM | 55.56 | 44.23 | 11.33 |
| without $NH_4HF_2$ | 66.63 | 45.74 | 20.89 |

As in Example 5, further analysis was performed:

| Designation | Adhesion measurement 1 [N/cm] | Adhesion measurement 2 [N/cm] | Adhesion measurement 3 [N/cm] | Shock test | Pd installation in mg/dm$^2$ |
|---|---|---|---|---|---|
| without HCl | 1.65 (1 d) | 2.74 (3 d) | 4.51 (7 d) | Failure after the 1st round | 0.361 |
| without $H_3PO_4$ | 8.56 (1 d) | 9.18 (3 d) | 10.21 (7 d) | Failure after the 2nd round | 0.45 |
| without $CH O_{22}$ | 3.84 (0 d) | 7.85 (2 d) | 10.12 (7 d) | Failure after the 2nd round | 0.43 |

-continued

| Designation | Adhesion measurement 1 [N/cm] | Adhesion measurement 2 [N/cm] | Adhesion measurement 3 [N/cm] | Shock test | Pd installation in mg/dm$^2$ |
|---|---|---|---|---|---|
| Without LM | 6.13 (0 d) | 10.43 (2 d) | 13.99 (7 d) | After 3rd round i.o. | 0.36 |
| without NH$_4$ HF$_2$ | 0.15 (1 d) | | 1.46 (7 d) | Failure after the 1st round | 0.39 |

EXAMPLE 7: VARIATION OF CONCENTRATIONS

| Varied Concentration | Surface free energy in mN/m | dispersive N/m | polar mN/m |
|---|---|---|---|
| 100 ml/l HCl | 55.95 | 38.31 | 17.64 |
| 200 ml/l HCl | 57.23 | 40.25 | 16.98 |
| 50 ml/l H$_3$ PO*$_4$ | 57.85 | 48.17 | 9.68 |
| 150 ml/l H$_3$ PO$_4$ | 53.1 | 38.77 | 14.33 |
| 50 ml/l formic acid | 65.16 | 48.04 | 17.12 |
| 150 ml/l formic acid | 59.5 | 44.02 | 15.48 |
| Without solvent | 63.58 | 47.46 | 16.12 |
| 20 ml/l 2-(2-butoxyethoxy)ethanol | 69.3 | 49.42 | 19.88 |
| 100 ml/l 2-(2-butoxyethoxy)ethanol | 60.34 | 45.69 | 14.65 |
| 10 g/L NH$_4$ HF$_2$ | 70.52 | 50.8 | 19.72 |
| 60 g/L NH$_4$ HF$_2$ | 66.32 | 50.8 | 15.52 |

| Varied Concentration | Cu layer in μm center | Adhesion measurement 1 (1 d) [N/cm] | Pd Installation in mg/dm$^2$ |
|---|---|---|---|
| 100 ml/l HCl | 34.8 | 12.43 | 0.41 |
| 200 ml/l HCl | 39.8 | 0.94 | 0.61 |
| 50 ml/l H$_3$ PO*$_4$ | 44.5 | 14.88 | 0.397 |
| 150 ml/l H$_3$ PO$_4$ | 38.3 | 4.19 | 0.56 |
| 50 ml/l formic acid | 39.1 | 14.2 | 0.413 |
| 150 ml/l formic acid | 43 | 6.77 | 0.58 |
| Without solvent | 46.9 | 11.34 | 0.413 |
| 20 ml/l 2-(2-butoxyethoxy)ethanol | 41 | 17.65 | 0.416 |
| 100 ml/l 2-(2-butoxyethoxy)ethanol | 47.1 | 3.84 | 0.36 |
| 10 g/L NH$_4$ HF$_2$ | 42.8 | NA | 0.377 |
| 60 g/L NH$_4$ HF$_2$ | 46 | NA | 0.49 |

The invention claimed is:

1. A process for pickling polyamide, comprising the steps
   a) contacting the polyamide with a pickling solution comprising
      a mixture of at least two inorganic acids
      MHF$_2$, where M is an alkali ion or an ammonium ion
      a monocarboxylic acid with 1 to 5 carbon atoms
   b) contacting with an organic solvent having 1 to 10 carbon atoms, wherein
   steps a) and b) take place consecutively or simultaneously.

2. The process according to claim 1, wherein the inorganic acids are hydrochloric acid, phosphoric acid, sulfuric acid, and nitric acid.

3. The process of claim 1, wherein the organic solvent is selected from n-butanol, isobutanol, t-butanol, isopropanol, n-propanol, a glycol ethers or mixtures thereof.

4. The process according to claim 3, wherein the glycol ether comprises 1-methoxy-2-propanol, 2-butoxyethan-1-ol, 2-(2-butoxyethoxy) ethanol, 2-(2-methoxyethoxy) ethanol, dipropylene glycol methyl ether, or mixtures thereof.

5. The process of claim 1, wherein the MHF$_2$ is NaHF$_2$, KHF$_2$, or a mixture thereof.

6. The process of claim 1, wherein the monocarboxylic acid is methanoic acid, ethanoic acid, propanoic acid, or a mixture thereof.

7. The process according to claim 1, wherein the concentrations in the pickling solution are
   mixtures of inorganic acids 1 to 5 mol/l
   MHF$_2$ 10 to 60 g/l
   monocarboxylic acid 50 to 300 g/l.

8. The process according to claim 7 wherein the concentrations in the pickling solution further comprise
   organic solvent 30 to 100 g/l.

9. The process according to claim 1, wherein the contacting is carried out at 20 to 50° C.

10. The process according to claim 1, wherein the contacting is performed for 3 to 15 minutes.

11. The process according to claim 1, wherein at least one rinsing step is used.

12. The process according to claim 1, followed by a step comprising a catalyst.

13. The process of claim 12, followed by a step of electroless nickel plating.

14. The process according to claim 1, wherein the inorganic acids are hydrochloric acid and phosphoric acid.

15. A pickling solution comprising
   a mixture of at least two inorganic acids
   $MHF_2$, where M is an alkali ion or an ammonium ion
   a monocarboxylic acid with 1 to 5 C atoms.

16. The pickling solution according to claim 15, additionally containing an organic solvent with 1 to 5 C atoms.

17. The pickling solution according to claim 15, wherein the concentrations in the pickling solution are
   mixtures of inorganic acids 1 to 5 mol/l
   $MHF_2$ 10 to 60 g/l
   monocarboxylic acid 50 to 300 g/l.

18. The pickling solution according to claim 17 wherein the concentrations in the pickling solution further comprise
   organic solvent 30 to 100 g/l.

19. The pickling solution according to claim 15, wherein the inorganic acids are selected from the group consisting of hydrochloric acid, phosphoric acid, sulfuric acid and nitric acid.

20. The pickling solution according to claim 15, wherein the inorganic acids comprise hydrochloric acid and phosphoric acid.

* * * * *